Dec. 16, 1930.  L. McCLAIN  1,785,588
PLANT DIGGING MACHINE
Filed Feb. 26, 1929   4 Sheets-Sheet 1
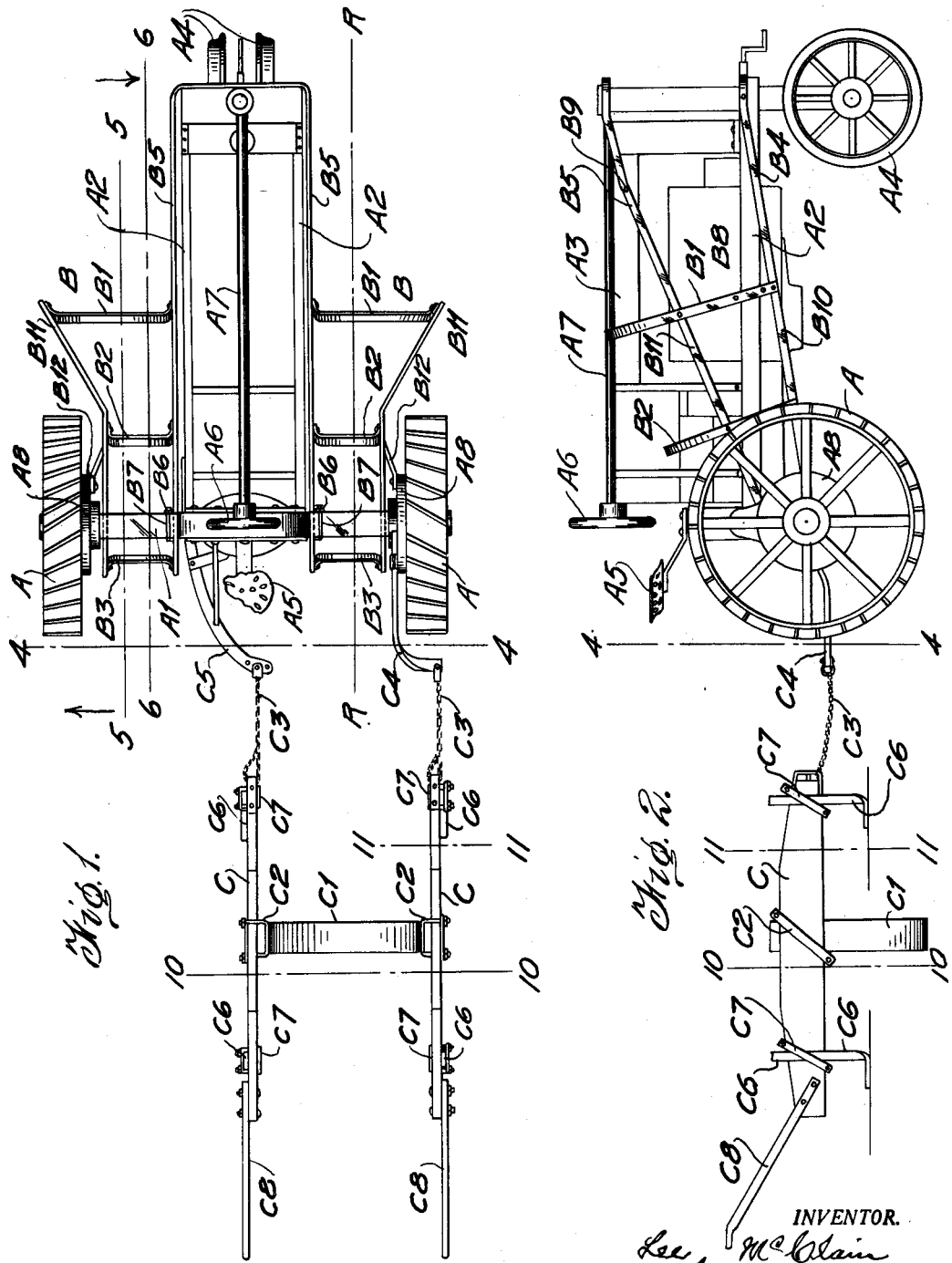
INVENTOR.
Lee McClain
BY Cyrus H Eler
ATTORNEY Dec. 16, 1930.                L. McCLAIN                1,785,588
                          PLANT DIGGING MACHINE
                    Filed Feb. 26, 1929        4 Sheets-Sheet 2
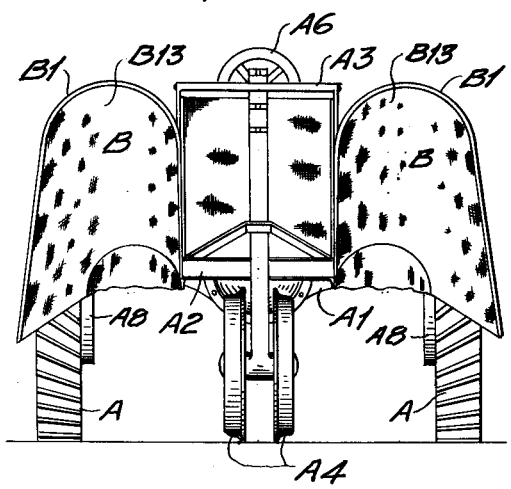
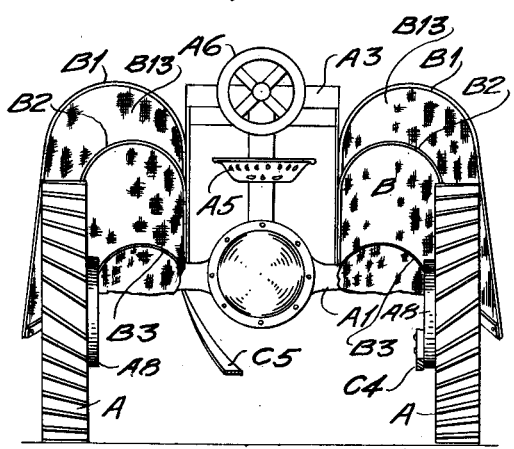
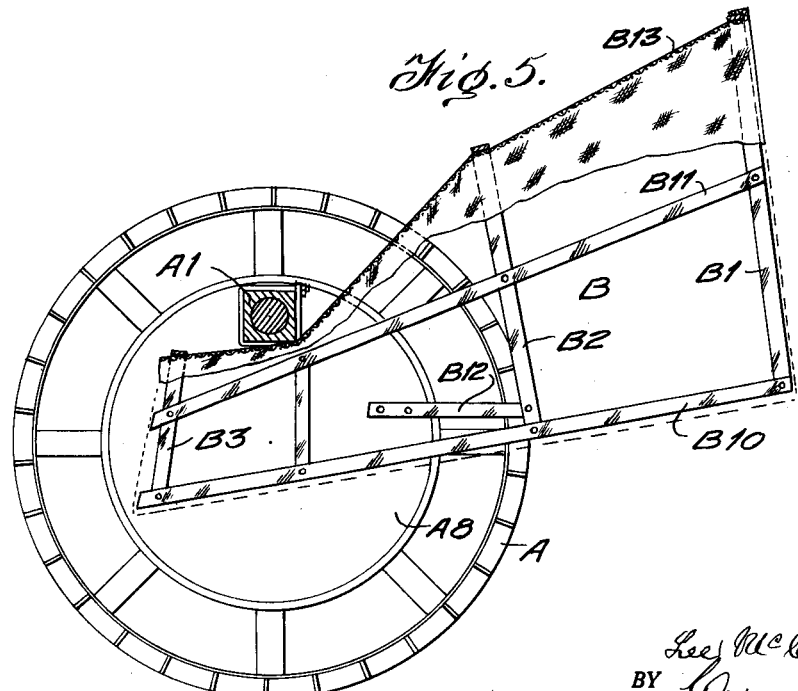
INVENTOR.
Lee McClain
BY
ATTORNEY Dec. 16, 1930.   L. McCLAIN   1,785,588
PLANT DIGGING MACHINE
Filed Feb. 26, 1929    4 Sheets-Sheet 3
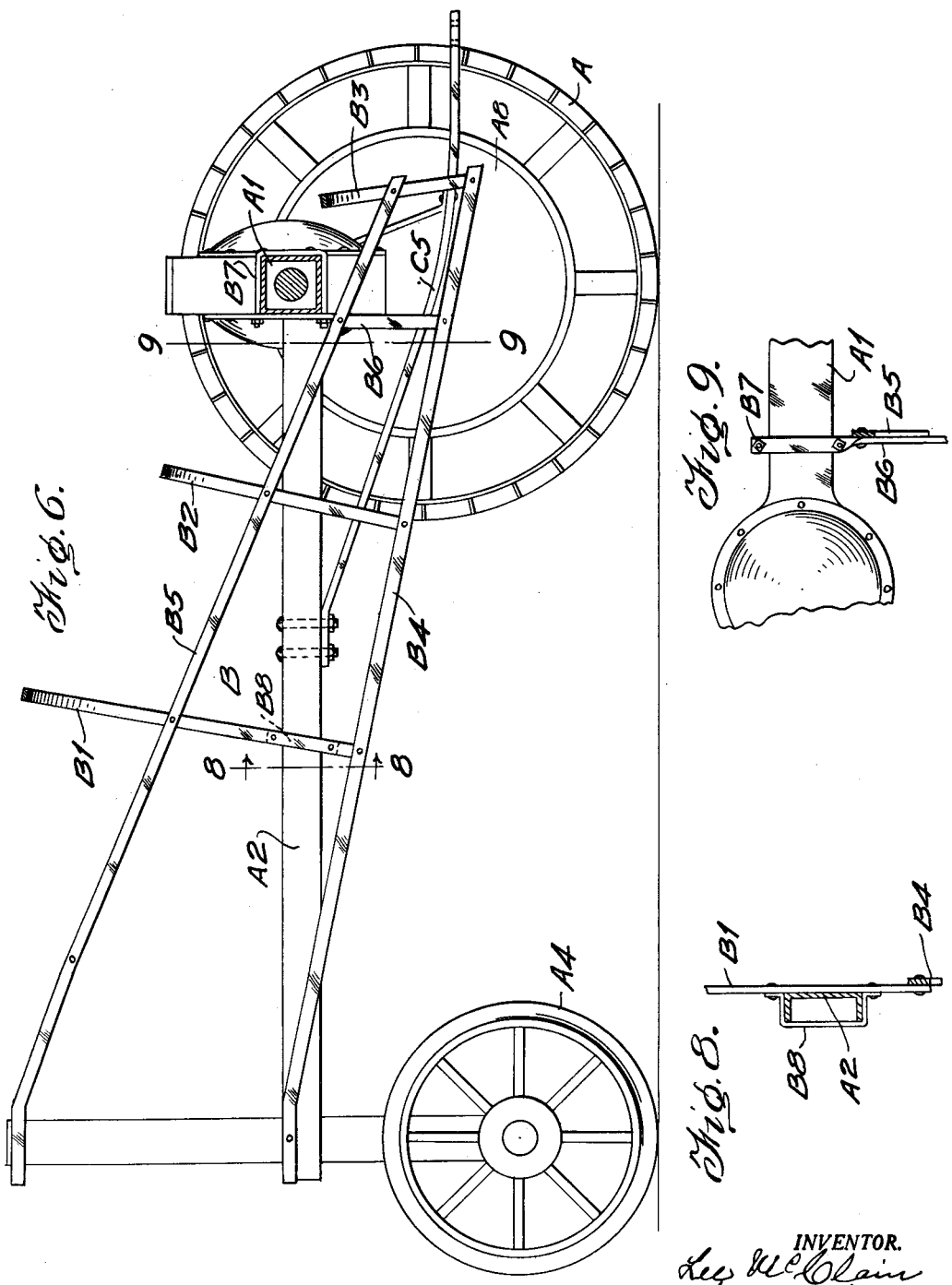

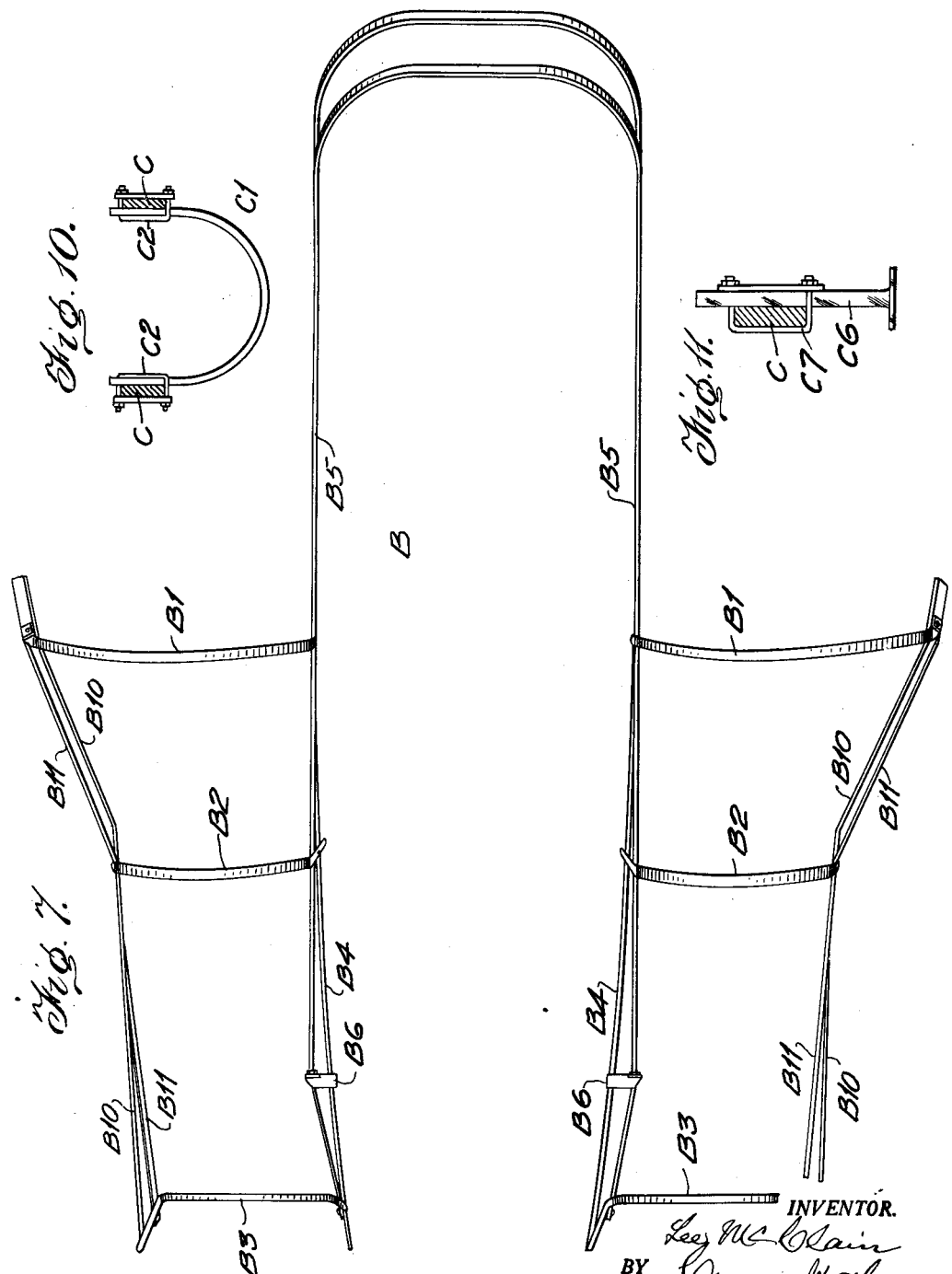

Patented Dec. 16, 1930

1,785,588

UNITED STATES PATENT OFFICE

LEE McCLAIN, OF KNOXVILLE, TENNESSEE

PLANT-DIGGING MACHINE

Application filed February 26, 1929. Serial No. 342,870.

This invention relates to plant digging machines and especially to machines adapted to dig trees standing in rows in a tree nursery, the machine traveling along the rows and moving a cutter in the ground parallel to the rows and at a depth sufficient to release the trees from the ground without cutting the roots of the trees to an objectionable extent, the trees then being free to be lifted from the ground and prepared for shipping or local transplanting.

A tractor is made a part of the machine and is adapted to pass over a row of the trees or two rows of trees. Such tractors as are used on farms have their drive wheels separated from each other sufficiently to allow so driving the tractor that two rows of trees, as ordinarily spaced in nursery practice, will be between those drive wheels. In some farm tractors there is a front steering wheel, or a pair of such wheels placed closely side by side, on a line which is midway between the paths to be traversed by the drive wheels. Thus the steering wheel or wheels may travel between the two rows of trees which are between the drive wheels of the tractor.

One of the objects of this invention is to provide means in the machine for guiding the trees while the machine is passing, that involving bending the trees forward and bending the branches of the trees toward the stems of the trees while the rows of trees are being traversed by the machine, this bending being done in such manner as to avoid such contact of the trees with the tractor as will break or objectionably bruise the trees, and particularly to allow the casing of the main axle of the tractor to pass over the trees without breaking or objectionably bruising the trees.

If the machine passes over two rows of trees, each row must be bent during the passing of the machine, whether the two rows are being dug at the same time or whether only one row is being dug while the machine is traversing the rows. Because in some cases the simultaneous digging of two rows requires more power than can readily be made available by the tractor, it is in such cases expedient to dig only one row at a time, although two rows are traversed by the machine.

It is also to be noted that at times the digging may begin at one side of a field, and the first row of trees traversed and dug, the machine traversing only that first row, and succeeding rows being similarly traversed one at a time. In such cases the machine need embody means for guiding only one row of trees.

Another object of the invention is to embody in such a machine efficient digging mechanism adapted to extend beneath the trees and be drawn along the row, the depth of the cut of the digging mechanism being adapted for variation at the will of the operator, and the digging mechanism being adapted to dig one row or both rows.

In the accompanying drawings,

Fig. 1 is a plan of a machine embodying my invention;

Fig. 2 is a side elevation of the same machine;

Fig. 3 is a front elevation;

Fig. 4 is a transverse upright section on the line, 4—4, of Figs. 1 and 2, looking toward the right;

Fig. 5 is an upright section on the line, 5—5, of Fig. 1, looking in the direction of the arrow;

Fig. 6 is an upright section on the line, 6—6, of Fig. 1, looking in the direction of the arrow;

Fig. 7 is a plan of the guiding mechanism detached from the tractor;

Fig. 8 is an upright, transverse section on the line, 8—8, of Fig. 6, looking in the direction of the arrows;

Fig. 9 is an upright, transverse detail section on the line, 9—9, of Fig. 6, looking toward the right;

Fig. 10 is an upright section on the line, 10—10, of Fig. 1, looking toward the right;

Fig. 11 is an upright, transverse section on the line, 11—11, of Figs. 1 and 2, looking toward the right.

Referring to said drawings, A, A are the tractor drive wheels. A1 is the casing for the axle which transmits power to the drive wheels, A. A2, A2 are lower beams or sills of the tractor body. A3 is an upper member of the tractor body. A4, A4 are a pair of front steering wheels on the tractor. These wheels are near each other and at opposite sides of the middle longitudinal upright plane of the tractor. Thus space is left between the wheels, A4, and the drive wheels, A; and the location of those spaces conforms approximately to the spacing of the nursery rows in ordinary practice. And it is to be understood that in planting nursery trees, the spacing between rows may be made to fit this spacing between the two drive wheels, A, A, and the steering wheels, A4, A4. A5 is the driver seat supported on the rear end of the tractor body immediately behind the hand wheel, A6, which is fixed on the horizontal transmission shaft, A7, the forward end of which is in operative relation with the steering wheels, A4, for changing the direction of those wheels, as is already well known.

When the machine is moving forward over two rows of trees, one row will be on the line R—R, while the other row is on the lines, 5—5 and 6—6, of Fig. 1, of the drawings. The axle casing, A1, (Figs. 1, 4, 5, 6 and 9) forms a transverse under structure which must pass over the trees. That implies that the trees must be bent down low enough to allow that casing to pass. To facilitate such bending, I apply to each side of the tractor a guiding or gathering structure which resembles a funnel, excepting that the lower part of the guiding structure is open, the cross section being inverted U-shape, and the large part of said structure being at the front and the smaller part leading to or under the axle casing.

In practice, I have found it quite feasible to make this machine traverse rows of nursery trees ranging from two feet to twelve feet or fifteen feet and even eighteen feet in height, without braking or brusing or skinning the trees to any harmful or objectionable extent.

As above indicated, in operation the machine may pass over only one row of trees; and then only a single gathering and guiding structure will be needed, that being at the side of the machine which passes over the row of trees. But it is preferable to place this guiding structure at both sides of the machine, in order that the single row may be traversed by either side of the machine or the machine may traverse two rows, even if the digging mechanism, to be described further on, digs only one row at a time. The drawings show the guiding structure or mechanism applied to each side of the machine, these structures being identical, excepting that they are reversed transversely. Since these structures function independently of each other, they may be entirely separate from each other; but, for attaining greater stability, they are preferably connected to each other at the front end of the machine, as shown by the drawings.

Referring now to Figs. 1, 2, 3, 4, 5 and 6, B designates the two guiding structures.

In the guiding structures are three inverted U-form frame members, B1, B2, B3, respectively. B1 is at the front, B2 is at the middle, and B3 is at the rear. These members vary in size serially, in the order named, B1, being highest and widest.

The lower ends of the arms of said members which are nearer the middle upright longitudinal plane of the machine extend downward to the longitudinal base bar, B4, and are joined to said bar. In the upright plane of the bar, B4, is the upper frame bar, B5, which crosses and is secured to said arms of the members, B1, B2 and B3. The frame bar, B5, is inclined, the rear end being the lower and extending under the axle casing, A1, while the forward end of said bar is considerably higher—the drawings show it at the height of the transmission shaft, A7, and bolted or riveted to the tractor member, A3, at B9. The base bar, B4, has its rear end lower than the rear end of the frame bar, B5, and is inclined upwardly to bring its forward end approximately to the height of the lower part of the tractor body. The drawings show that end at the height of the forward part of the body sills, A2, and there suitably attached. A strap-form hanger, B6, overlaps the bars, B4 and B5, and the forward face of the axle casing, A1, and is secured to said casing by means of a stirrup, B7. The U-form member, B1, lies against the adjacent face of the body sill, A2, and is clamped to said sill by means of a yoke or stirrup, B8.

While, as above stated, the two guiding structures B, may be entirely independent of each other, excepting that each is attached to the tractor body, the drawings show them actually joined by making the base bars, B4, unitary and extending around and engaging the forward end of the tractor and making the upper frame bars, B5, unitary and extending around and engaging the front end of the tractor body.

The lower ends of the outer arms of the U-form members, B1, B2 and B3, are joined to each other by means of a base bar, B10; and the upper parts of said arms are joined by a similar bar, B11. Said outer arms and the bars, B10 and B11, may be suitably stayed, as by means of a brace, B12, having one end joined to the arm, B2, and having its other end joined to the wheel gear casing, A8.

As another element of the guiding structure, canvas cloth or similar sheet-form material, B13, is placed as a lining for each guiding structure, said lining being attached to the U-form members, B1, B2 and B3, and to the bars, B4, B5, B10 and B11, whereby a wall of U-form cross section is formed, that wall converging from the front rearward and extending under the shaft casing, A1, and presenting a surface which can make contact with the trees and bend them down and slide over them without material injury to the trees.

The rear part of the machine is a digging structure which is coupled to the main part of the machine to drag in a manner similar to the dragging of a plow drawn by a tractor. C, C are digger beams separated far enough from each other to allow a row of trees to pass between them. Between said beams is a digger, C1, of U-form and having each end overlapping one of the beams and rigidly secured to its beam by means of a clamp, C2. Said digger is to be wide enough and low enough to pass under the trees and avoid unnecessarily cutting the roots of the trees during the forward movement of the machine. The clamps, C2, may be loosened to permit setting the digger higher or lower, after which the clamps are again to be made fast.

It is to be remembered that the beams, C, C are separate and far enough apart to allow the passing of trees and that the U-form digger is to be low enough to go under the trees, and that the digger is the only connection between the two beams. Hence the digging structure may move forward and at all times pass around the base of the trees.

At the forward end of each beam is a chain, C3, having its rear end coupled to the beam and having its forward end coupled to the rear end of an arm or draft beam which is supported on the body of the tractor. The chain at the right, as shown in Fig. 1 of the drawings, is coupled to the draft beam, C4, which is suitably joined to the left hand face of the gear casing which is on the axial line of the drive wheels, A. The forward part of the chain, C3, at the left of the machine is joined to the draft beam, C5, which is suitably joined to the body sill, A2, and the axle casing, A1. It will be observed that the forward connection of the draft beam, C5, is so far leftward of the middle longitudinal line of the digger structure as to tend to balance the draft on the tractor, although the middle longitudinal line of the digger structure is not on the middle longitudinal line of the forward part of the machine. The chains make jointed connections between the digger beams and the tractor body. By coupling to different links of the chains, the direction of the draft may be varied.

Near each end of each beam, C, is a foot, C6, which is adapted to slide on the upper face of the ground to control the downward movement of the digger structure. Each foot has a stem lying against the adjacent beam and is secured to the beam by means of a clamp, C7. These clamps permit up and down adjustment of the feet, C6. On the rear end of each beam, C, is a handle, C8, which is to be used by an attendant for guiding or controlling this digger structure. It is to be understood that these handles travel at opposite sides of the row of trees, and that each handle can be reached only from its side of the row of trees.

In operation, during the forward movement of the machine, the forward part of the guiding structure, B, bears against the trees and gathers its branches toward the stem of the tree and presses the tree downward. During the further forward movement of the guiding structure, the tree branches are still further drawn or pressed toward the tree stem and the tree is bent downward still further, until the rear end of the guiding structure (the part under the axle casing) has passed over all of the tree. Then the tree is free to rise, and rises fully or partially, and the digger beams, C, pass at each side of the tree and the U-form digger, C1, passes under the tree for the release of the tree. But the machine does not remove the trees. All the trees usually remain standing or leaning, but they may now be lifted out of place by workmen and packed for shipping.

I claim as my invention,

1. In a plant digging machine, in combination, a tractor having a transverse under structure, and a funnel-form guiding structure mounted longitudinally of the tractor with its smaller end directed rearward and extending beneath and rearwardly beyond the transverse under structure.

2. In a plant digging machine, in combination, a tractor having drive wheels and a body structure supported between the wheels, and a gathering and guiding structure supported longitudinally of the body structure inwardly of the drive wheels for directing the plants in a protected manner beneath the body structure traversing the plant.

3. In a plant digging machine, in combination, a tractor having drive wheels and an axle supporting the wheels, and a funnel-form guiding structure of inverted U-formation mounted longitudinally of the tractor with its smaller end directed rearward and extending beneath the axle.

4. In a plant digging machine, in combination, a tractor having drive wheels and an axle supporting the wheels, and a funnel-form guiding structure of inverted U-formation mounted longitudinally of the tractor between the drive wheels with the rear smaller end of the guiding structure extending beneath and rearwardly beyond the axle for directing the plants in a protected manner beneath the axle.

5. In a plant digging machine, in combination, a tractor having drive wheels and an axle supporting the wheels, and a plant guiding and gathering structure embodying a funnel-form frame of inverted U-formation supported longitudinally of the tractor with its smaller end directed rearward and extending beneath the axle, and a fabric lining arranged over the interior of the funnel-form frame.

6. In a plant digging machine, in combination, a tractor having drive wheels and an axle supporting the wheels, and combined plant gathering and guiding means for directing plants in a protected manner beneath the axle embodying a pair of funnel-form guiding structures mounted in parallel relation longitudinally of the tractor inwardly of the drive wheels with the smaller ends of the structures directed rearward and extending beneath the axle.

7. In a plant digging machine, in combination, a tractor having drive wheels and an axle for the wheels, a combined plant gathering and guiding structure for directing plants of two rows in a protected manner beneath the axle embodying a frame supported on the tractor and including a pair of funnel-form guide frames of inverted U-formation extending longitudinally of the tractor with the smaller rear ends of the frames directed rearward and beneath the axle, and a fabric lining disposed inwardly of each guide frame.

8. In a plant digging machine, in combination, a tractor including rear drive wheels, a front steering wheel at the longitudinal center of the tractor, and an axle for the rear wheels, and a funnel-form guiding structure of inverted U-formation mounted longitudinally of the tractor on a line between the steering wheel and one drive wheel with the smaller end of the guiding structure directed rearward and extending beneath the axle.

9. In a plant digging machine, in combination, a tractor including rear drive wheels, an axle for the wheels, and a front steering wheel at the longitudinal center of the tractor, a funnel-form guide frame of inverted U-formation mounted longitudinally of the tractor inwardly of each drive wheel with its forward larger end in the forward path of travel of the axle and with its smaller end directed rearward and extending beneath the axle, and a fabric lining disposed inwardly of each frame for directing the plant in a protected manner beneath the axle.

10. In a plant digging machine, in combination, a tractor including rear drive wheels, an axle for the wheels, a front steering wheel at the longitudinal center of the tractor and a tractor body supported by the drive and steering wheels, a combined gathering and plant guiding means including a frame supported by the body embodying longitudinal frame members extending at opposite sides of the body, a funnel-form guide frame of inverted U-formation supported by each longitudinal frame member with its smaller end directed rearward and extending beneath the axle, and a fabric lining arranged inwardly of each guide frame.

11. In combination, a tractor including rear drive wheels, an axle for the wheels, and a front steering wheel at the longitudinal center of the tractor, a funnel-form guide frame of inverted U-formation mounted longitudinally of the tractor inwardly of the drive wheels with the rear smaller end of the frame extending beneath the axle, and a lining arranged over the inner surface of the frame presenting a smooth surface for engaging the plants over which the tractor is moving.

12. In a plant digging machine, in combination, a tractor having rear drive wheels and a body structure supported between the wheels, and an inverted U-shaped plant guiding structure mounted longitudinally of the tractor for directing plants in a protected manner beneath the body structure.

13. In a two row combined plant gathering and guiding device for attachment to self-propelled vehicles, a substantially U-shaped mounting frame embodying parallel side bars, a funnel-form guide frame of inverted U-formation supported longitudinally of each side bar with the smaller ends of the guide frames directed rearward, and a flexible lining secured inwardly of each guide frame.

14. In a plant digging machine, in combination, a tractor having rear drive wheels, an axle for the wheels and a front steering wheel at the longitudinal center of the tractor, a funnel-form guiding structure of inverted U-formation mounted longitudinally of the vehicle on a line between one drive wheel and the steering wheel with its smaller end directed rearward and extending beneath the axle, draft beams projecting rearwardly from the tractor, a digger beam connected with each draft beam, and a U-shaped digger having its arms connected one to each of said digger beams.

15. In a plant digging machine, in combination, a tractor having rear drive wheels, an axle for the wheels and a front steering wheel at the longitudinal center of the tractor, a funnel-form guiding structure of inverted U-formation mounted longitudinally of the vehicle on a line between one drive wheel and the steering wheel with its smaller end directed rearward and extending beneath the axle, a pair of draft beams extending rearwardly from the axle, digger beams having a flexible coupling one with each of the draft beams, said digger beams being disposed one to each side of the forward path of travel of the guiding structure, and a U-shaped digger having its arms connected one to each of the digger beams and forming the sole coupling between the digger beams.

16. In combination, a tractor including rear driving wheels, an axle for the wheels and a front steering wheel at the longitudinal center of the tractor, a funnel-form guiding structure of inverted U-formation mounted longitudinally at each side of the body of the tractor, said guiding structures having their smaller rear ends directed beneath the axle, a pair of draft beams projecting rearwardly from the axle, a digger beam connected with each draft beam, and a U-shaped digger having its arms connected one to each of the digger beams, said draft beams retaining the digger in a position longitudinally of the tractor in alignment with one of said guiding structures.

In testimony whereof I have signed my name, this 19th day of February, in the year one thousand nine hundred and twenty-nine.

LEE McCLAIN.